United States Patent [19]
Narisawa

[11] Patent Number: 5,187,746
[45] Date of Patent: Feb. 16, 1993

[54] STRUCTURE OF BATTERY RECEIVING CHAMBER

[75] Inventor: Yoshiyuki Narisawa, Tokyo, Japan

[73] Assignee: Rion Kabushiki Kaisha, Tokyo, Japan

[21] Appl. No.: 796,371

[22] Filed: Nov. 22, 1991

[30] Foreign Application Priority Data
Nov. 27, 1990 [JP] Japan .............. 2-125464[U]

[51] Int. Cl.⁵ .................. H04R 25/00; H01M 2/12
[52] U.S. Cl. .................. 381/68.7; 381/692; 429/86; 429/98; 429/100
[58] Field of Search .............. 429/86, 98, 100; 381/68.7, 69.2

[56]  References Cited
U.S. PATENT DOCUMENTS

| | | | |
|---|---|---|---|
| 2,759,038 | 8/1956 | Marsal | 429/86 X |
| 3,507,708 | 4/1970 | Vignaud | 429/86 |
| 3,909,302 | 9/1975 | Mermelstein | 429/86 |
| 4,532,193 | 7/1985 | Kniazzeh et al. | 429/86 X |
| 4,916,034 | 4/1990 | Hulsebus et al. | 429/86 |

Primary Examiner—John S. Maples
Attorney, Agent, or Firm—Sughrue, Mion, Zinn, Macpeak and Seas

[57] ABSTRACT

A receiving chamber for an air cell battery for use in an electronic device having a casing 2 in which a battery receiving chamber 11 having an open upper end is defined by a wall portion thereof comprises a cover member 13 for selectively closing the open end of the battery receiving chamber, a through-hole 31; 41 formed in the battery receiving chamber for communicating the battery receiving chamber externally, and filter means 32 provided in the through-hole for repelling the water content of air supplied through the through-hole to the battery receiving chamber while allowing air to pass through.

8 Claims, 4 Drawing Sheets

STRUCTURE OF BATTERY RECEIVING CHAMBER

BACKGROUND OF THE INVENTION

The present invention relates to a structure of a battery receiving chamber of an electronic device to be worn on a human body and, particularly, to a structure of a battery receiving chamber for water-tightly receiving an air cell battery to which air has to be supplied.

A typical example of a conventional electronic device adapted to be used in a state attached directly to a human body is a hearing aid of the ear-piece type such as shown in FIG. 6. FIG. 6 is a side view of such a hearing aid 1, composed of a casing 2, a microphone 3 provided in an upper portion of the casing 2, electronic circuitry (not shown) including a signal amplifier and provided in the casing 2 for suitably amplifying sound picked-up by the microphone to provide a sound output, a curved sound conduit 4 in the form of a hook to be hanged fittingly on an upper portion of an ear of a wearer for conducting the sound output of the electronic circuitry through its top opening to the ear, and a battery (not shown) for energizing the amplifier. The battery is received in a battery receiving chamber provided in a lower portion of the casing 2, which is closed by a cover 5 as shown.

As shown in FIG. 6, a side face 2A of the casing 2 is shaped to fit the rear side of the ear of the wearer. With the curved sound conduit 4 and the side face 2A of the casing 2, the hearing aid 1 can be worn without giving any abnormal feeling to the wearer.

In order to make it possible to take a bath or to swim while protecting the hearing aid, in particular, the casing 2 thereof, against water, the hearing aid is usually made water-tight, otherwise, internal electric and electronic elements may be damaged.

Such water-tight structure is usually provided by utilizing O-rings of elastic material each in a junction of adjacent constitutional parts.

Such a conventional hearing aid is very effective insofar as the battery to be used is a shielded battery such as a mercury battery, etc.

On the other hand, an air cell, for example, an air-zinc battery, which utilizes oxygen in air to depolarize a positive electrode of the battery chemically by means of reduction of oxygen, is known as having less public pollution problems and a large electric capacity, compared with a conventional mercury battery. Therefore, it is highly desired to use such an air cell for a hearing aid. When such an air cell is to be used as the power source of the hearing aid, it is necessary to supply air to the battery. However, the water proof structure of the conventional hearing aid does not allow the use of an air cell since air can not be supplied to the battery provided within the casing thereof.

SUMMARY OF THE INVENTION

An object of the present invention is to provide a structure of a battery receiving chamber of a water-proof hearing aid, which is capable of introducing a sufficient amount of air thereinto.

According to the present invention, the above object can be achieved by providing through-holes in a wall of a hearing aid which defines a battery·chamber and providing a water-proof filter in each of the through-holes, to allow air to flow through the filters while preventing water entry, together with air, into the through-holes from further moving into the battery chamber by the filters.

BRIEF DESCRIPTION OF THE DRAWINGS

The above and other objects, features and advantages of the present invention will become more apparent by reference to the following detailed description of the present invention taken in conjunction with the accompanying drawings, wherein.

DETAILED DESCRIPTION OF THE PREFERRED EMBODIMENTS

An embodiment of the present invention, applied to a ear-piece type hearing aid, will be described in detail with reference to the drawings.

Figure 1:
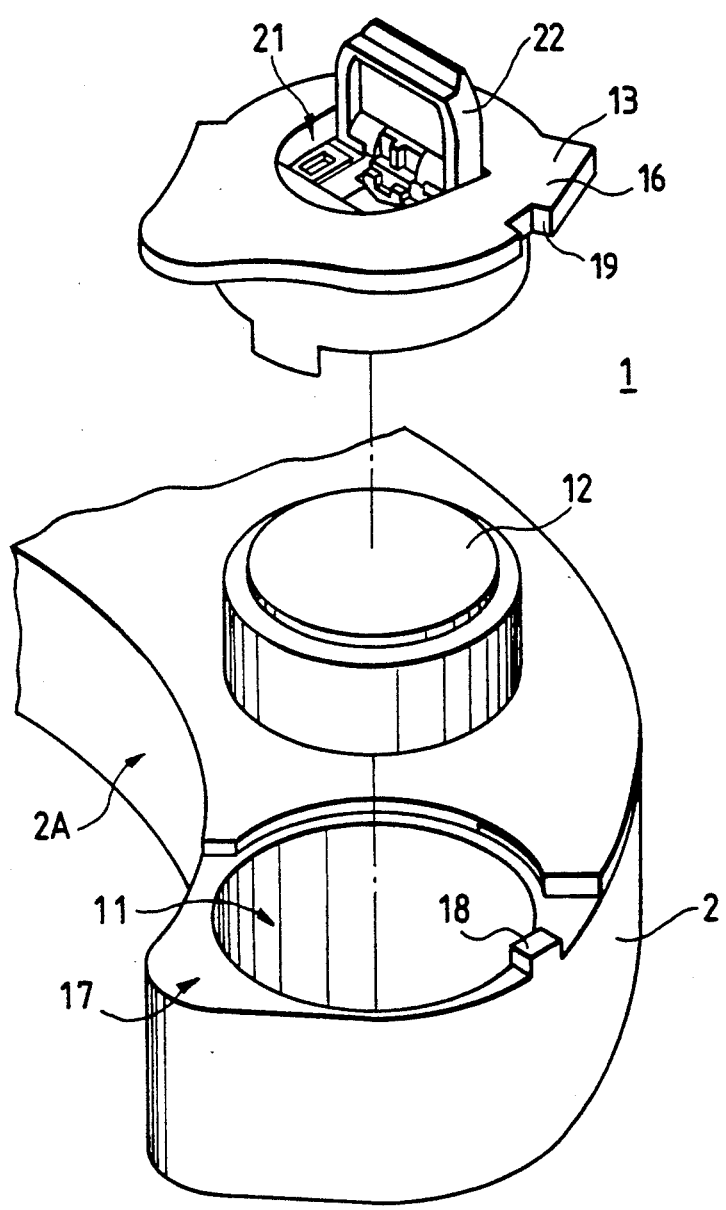
FIG. 1 is a disassembled, perspective view of an embodiment of a battery receiving chamber according to the present invention.
Figure 6:
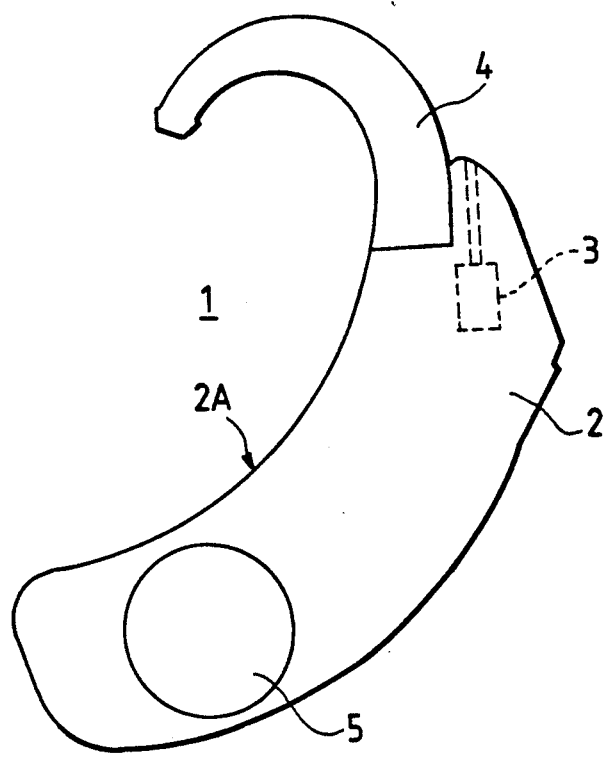
FIG. 6 is a front view of a conventional ear-piece type hearing aid.

In FIG. 1 in which components corresponding to those shown in FIG. 6 are depicted by same reference numerals, respectively, a battery receiving chamber 11 in the form of a cylindrical space is formed in a lower end portion of a casing 2 of a hearing aid 1. The battery receiving chamber 11 is associated with a cover member 13. A battery 12 which is flat circular disc in shape and which comprises an air-zinc battery is inserted into the chamber 11 and, then, by fitting the cover member 13 in the casing 2, the battery 12 can be held within the chamber 11. A portion of the casing 2 in which the cylindrical battery receiving chamber 11 is formed is stepped down and an upright protrusion or post 18 is formed in a peripheral portion of the cylindrical chamber 11.

Figure 2:
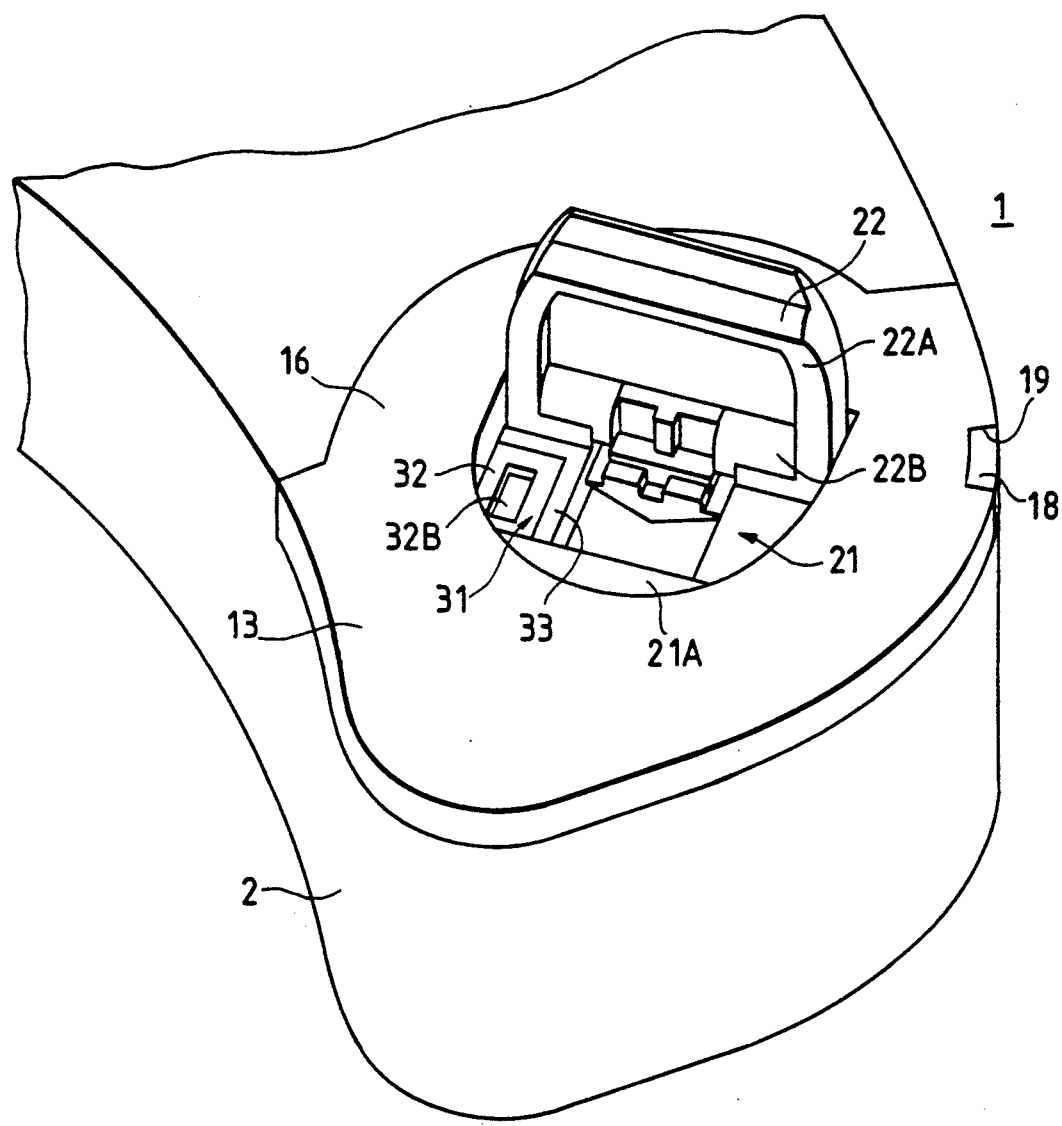
FIG. 2 is a perspective view showing an assembly of the battery receiving chamber shown in FIG. 1.

The cover member 13 is adapted to be put on an upper open end of the cylindrical battery receiving chamber 11 as shown in FIG. 2 to close the open end.

Figure 3:
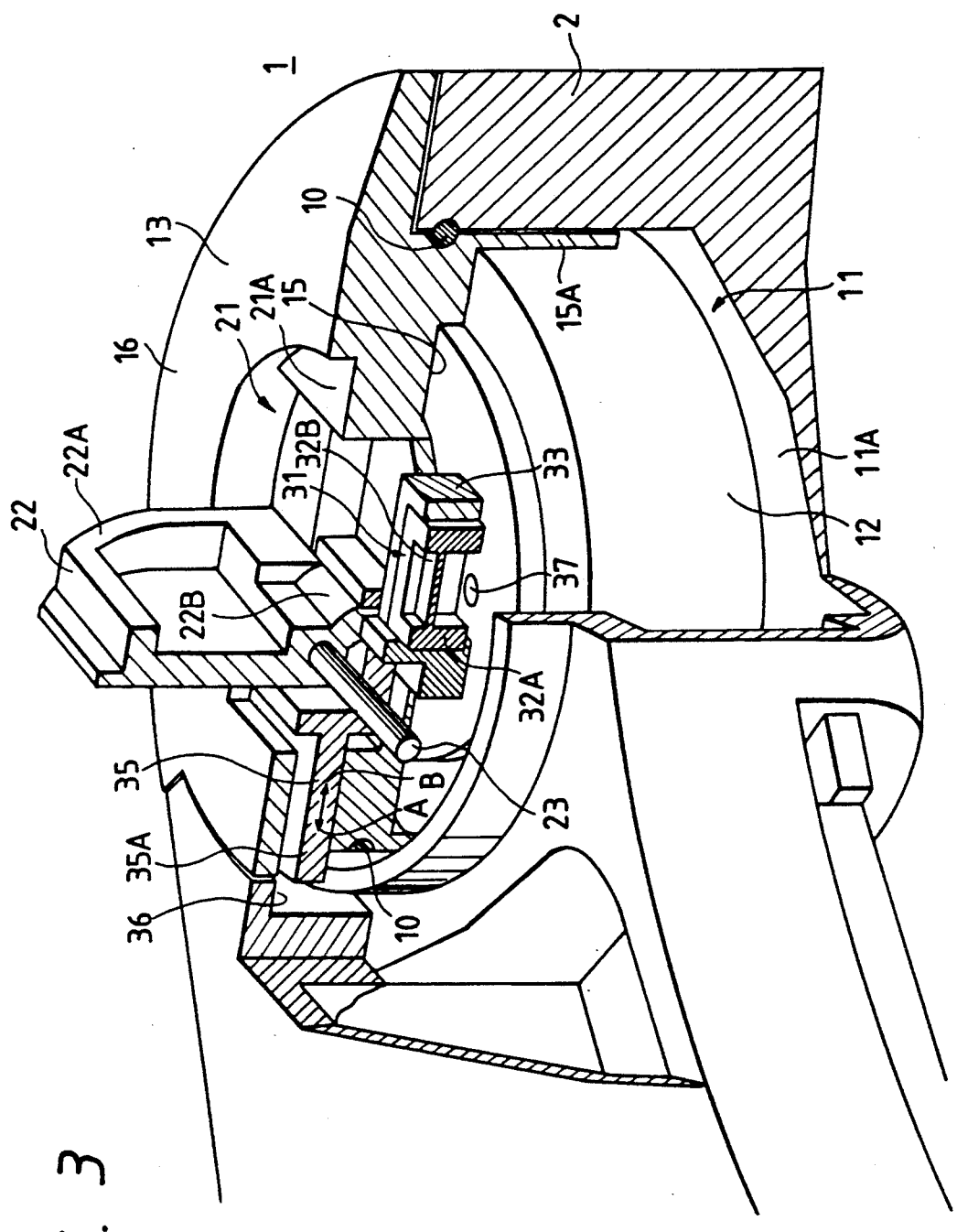
FIG. 3 is an enlarged, perspective view of a portion of the embodiment shown in FIG. 2.

Referring to FIGS. 1 and 2 as well as FIG. 3 which shows the cover member 13 in partial cross section, the cover member 13 includes integrally a flange portion 16 having a peripheral notch 19 and shaped to fit with the stepped down portion of the casing 2, and an outer side wall portion 15A extending downwardly from a lower surface of the flange portion 16 to define a recess 15 having substantially the same configuration as an outer configuration of the battery 12. An outer diameter of the side wall portion 15A is slightly smaller than an inner diameter of the cylindrical chamber 11 so that the side wall portion 15A, when inserted into the cylindrical chamber 11 in which the battery 12 is received with the notch 19 being fitted on the protrusion 18 of the casing 2, is fixedly fitted between an outer wall of the battery 12 and the inner wall of the cylindrical chamber 11.

As shown in FIG. 3, an O-ring 10 of elastic material is arranged between the outer surface of the side wall portion 15A and the inner wall of the cylindrical chamber 11 to provide a water-proof structure.

In a central portion of an upper surface of the flange portion 16 of the cover member 13, a circular recess 21 having a shoulder portion 21A is formed in which a circular flap 22 is supported pivotably on a shaft 23 traversing the recess 21. A diameter of the flap 22 is smaller than an inner diameter of the recess 21 such that the flap 22 can close the recess 21 with a gap therebetween which is small enough to prevent water to pass while allowing air or vapor to pass through.

A bottom surface of the recess 21 is formed with a groove having a sharp-angled U shape cross section and a passage or slot is formed in a wall portion of the recess 21, which extends laterally from an end portion of the groove and opens at an outer side wall of the cover member 13. A slide member 35 is provided in the cover member 13. The slide member 35 includes a laterally extending portion 35A and an engaging portion integral with the lateral portion 35A. The lateral portion 35A is inserted into the passage and the engaging portion is slidably received in the groove, so that the slide member 35 is slidable along the groove and, at one extreme position thereof, the lateral portion protrudes from the side wall of the cover member 13 and, at the other extreme position, it is completely retracted in the cover member.

One side portion 22A of the flap 22 is cut away to provide a space for facilitating a lifting operation thereof and the other side portion thereof is pivotably supported by the shaft 23 so that the flap 22 can be pivotally lifted up by the one side thereof. The other side portion 22B of the flap 22 engages with the engaging portion of the slide member 35 so that the lateral portion 35A of the slide member 35 moves in a direction A (FIG. 3) to protrude from the side wall of the cover member 13 into a locking space or undercut 36 formed on the side wall portion of the battery receiving chamber 11 to thereby lock the cover member 13 to the casing 2, when the flap 22 is in a closed position. When the flap 22 is lifted up, the slide member 35 is moved in a direction B (FIG. 3) to retract the lateral portion thereof, in which state a user can detach the cover member 13 from the casing 2.

The bottom surface of the recess 21 is formed with a generally rectangular through-hole 31 surrounded by a rectangular fixing portion 33 in which a rectangular water-proof filter 32 is removably fitted. The filter 32 is composed of a rectangular frame member 32A and a filter member 32B in the form of film formed from porous continuous fibres of water repelling material such as tetrafluoroethylene resin and extended over the frame member 32A.

In operation, after the battery 12 is put in the cylindrical chamber 11, the cover member 13 with the flap 22 lifted up is fitted in the chamber 11 as shown in FIG. 2. In this state, the battery 12 is fixed by the side wall portion 15A of the cover member 13. Then, the flap 22 is pushed down into the recess 21, in which state the lateral portion 35A of the slide member 35 is locked in the locking space 36 of the casing 2 and thus the cover member 13 is locked thereto.

Due to the presence of the O-ring 10 between the cover member 13 and the casing 2, water invasion into the cylindrical battery receiving chamber 11 can be prevented. Since, as mentioned previously, a small gap is provided between the flap 22 and the recess 21, gas such as a mixture of air and water vapor can enter into the recess 21 therethrough.

Water content of the mixture gas, whose particle size is much larger than molecules of air, is blocked by the filter member 32B of the filter 32, allowing only air to pass through into an air hole 37 of the air cell battery 12.

Thus, it is possible to depolarize a positive electrode of the battery chemically by the reduction of oxygen contained in air to thereby generate power with which electric and/or electronic circuit components of the hearing aid are energized. The battery can be exchanged by removing the cover member 13 by lifting up the flap 22, and the filter member 32 also can be exchanged by pulling it out in this state.

Figure 4:
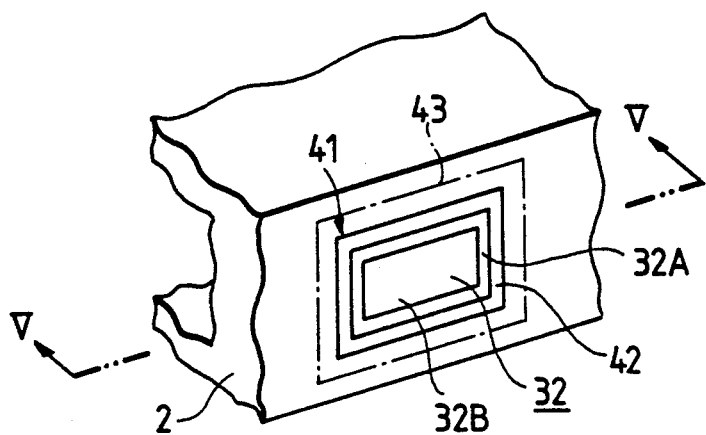
FIG. 4 is a perspective view showing another embodiment of the present invention.
Figure 5:
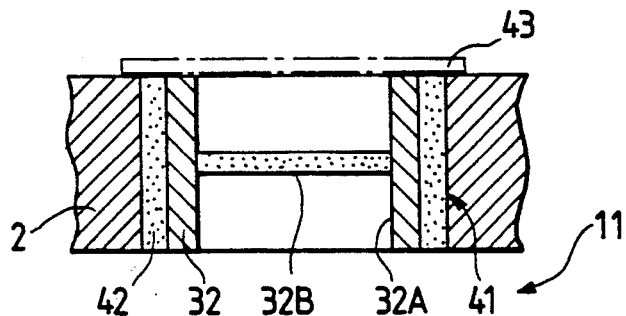
FIG. 5 is a cross section taken along a line V—V in FIG. 4.

FIG. 4 shows another embodiment of the present invention and FIG. 5 is a cross section taken along a line V—V in FIG. 4. In FIGS. 4 and 5, the filter 32 is fitted not in the recess 21 of the cover member 13 but in a through-hole 41 formed in the side wall of the casing 2 and communicated with the chamber 11. The fitting of the filter 32 composed of the frame member 32A and the filter member 32B in the through-hole 41 is performed through a water-proof member 42 of such as elastic material.

A protective member 43 in the form of metal mesh is provided over the through-hole 41 to prevent the filter member 32B from being damaged externally.

With the structure shown in FIGS. 4 and 5, water content of gas entering into the through-hole 41 through the protective member 43 is blocked by the filter member 32B while air is allowed to enter into the battery chamber 11.

Although the present invention has been described as being applied to an ear piece type hearing aid, this description is not meant to be construed in a limiting sense. For example, the present invention is also applicable to other electronic devices which may be attached to wearers.

Various modifications of the disclosed embodiment, as well as other embodiments of the present invention, will become apparent to persons skilled in the art upon reference to the description of the present invention. It is, therefore, contemplated that the appended claims will cover any modifications or embodiments as fall within the true scope of the present invention.

What is claimed is:

1. A receiving arrangement for an air cell battery (12) for use in an electronic device, comprising:
   a battery receiving chamber (11) defined by a wall portion of a casing (2) of said electronic device, with an upper end of said battery receiving chamber being open;
   a cover member (13) for selectively closing said open end of said battery receiving chamber;
   a through-hole (31; 41) formed in one of said cover member and said wall portion of the casing for communicating said battery receiving chamber externally; and
   filter means (32) provided in said through-hole for repelling a water content of air supplied through said through-hole to said battery receiving chamber while allowing air to pass through,
   wherein said cover member comprises:
   a flange plate (16) configured to overlie the open upper end of the battery receiving chamber,
   a generally central recess (21) defined in an upper surface of the flange plate,
   a flap (22) pivotably mounted in said recess by a shaft (23) extending laterally across said recess, said flap being pivotally liftable from the recess, a through slot defined in said cover member and extending from a side wall of the recess to an outer side wall of the cover member, and e) a slide member (35) disposed in the slot and movable between an outwardly extended position and an inwardly retracted position in response to and under the control of the pivoting of the flap, a laterally outermost end (35A) of the slide member engaging an undercut (36) defined in said wall portion of the casing to lock the cover member in place in the outwardly extended position thereof, and enabling the removal of the cover member in the inwardly retracted position thereof.

2. The receiving arrangement claimed in claim 1, wherein said through-hole is formed in said cover member.

3. The receiving arrangement claimed in claim 1, wherein said through-hole is formed in a side wall of said battery receiving chamber.

4. The receiving arrangement claimed in claim 2 or 3, wherein said filter means comprises a removable frame member and a porous filter member stretched on said frame member, said filter member being formed of a material having characteristics of repelling water content while allowing air to pass through.

5. The receiving arrangement claimed in claim 4, wherein said removable frame member is removably fitted in said through-hole.

6. The receiving arrangement claimed in any of claims 1 to 3, wherein said cover member further comprises:

a notch (19) formed in a peripheral portion of the flange plate;

a post (18) upstanding from the wall portion of the casing and adapted to mate with the notch to accurately position the cover member; and a cylindrical wall portion (15A) extending downwardly from a lower surface of said flange plate and surrounding said battery.

7. The receiving arrangement claimed in claim 1, wherein the electronic device is a hearing aid configured to be hung on a user's ear.

8. The receiving arrangement claimed in claim 7, wherein the flap, in a closed position thereof, fits in the recess with a sufficiently small clearance to prevent the entry of water into the battery receiving chamber.

* * * * *